(12) United States Patent
Hamamichi

(10) Patent No.: US 8,811,584 B2
(45) Date of Patent: Aug. 19, 2014

(54) COMMUNICATION APPARATUS

(71) Applicant: Akihiro Hamamichi, Kanagawa (JP)

(72) Inventor: Akihiro Hamamichi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/708,188

(22) Filed: Dec. 7, 2012

(65) Prior Publication Data

US 2013/0148799 A1 Jun. 13, 2013

(30) Foreign Application Priority Data

Dec. 9, 2011 (JP) .................................. 2011-270598

(51) Int. Cl.
*H04M 1/56* (2006.01)
*H04M 15/06* (2006.01)

(52) U.S. Cl.
USPC .................................................... 379/142.17

(58) Field of Classification Search
USPC ........................................ 379/142.01, 142.17
See application file for complete search history.

(56) References Cited

FOREIGN PATENT DOCUMENTS

JP 3506811 12/2003
JP 2010-098482 4/2010

*Primary Examiner* — Sonia Gay
(74) *Attorney, Agent, or Firm* — Harness, Dickey & Pierce, P.L.C.

(57) ABSTRACT

An apparatus includes a direct-current direction detection unit configured to detect a change of direct-current direction on a telephone line through which the apparatus and an exchanger are coupled; a voltage change detection unit configured to detect a change of voltage on the line; a first control unit configured to transmit a reception completion signal to the exchanger when receiving telephone number; a first determination unit configured to determine whether polarity reversal of the line occurs in a period from reception of the telephone number to transmission of the reception completion signal; a second determination unit configured to determine whether the polarity reversal occurs in a period from transmission of the reception completion signal to reception of a calling signal; and a second control unit configured not to display the received telephone number on a display unit when the polarity reversal occurs in at least one of the periods.

5 Claims, 11 Drawing Sheets

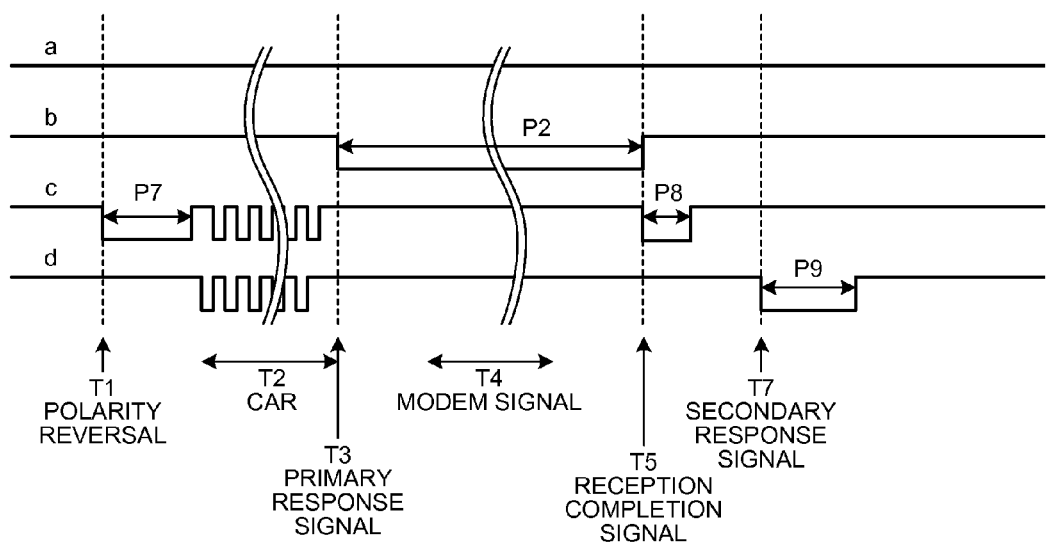

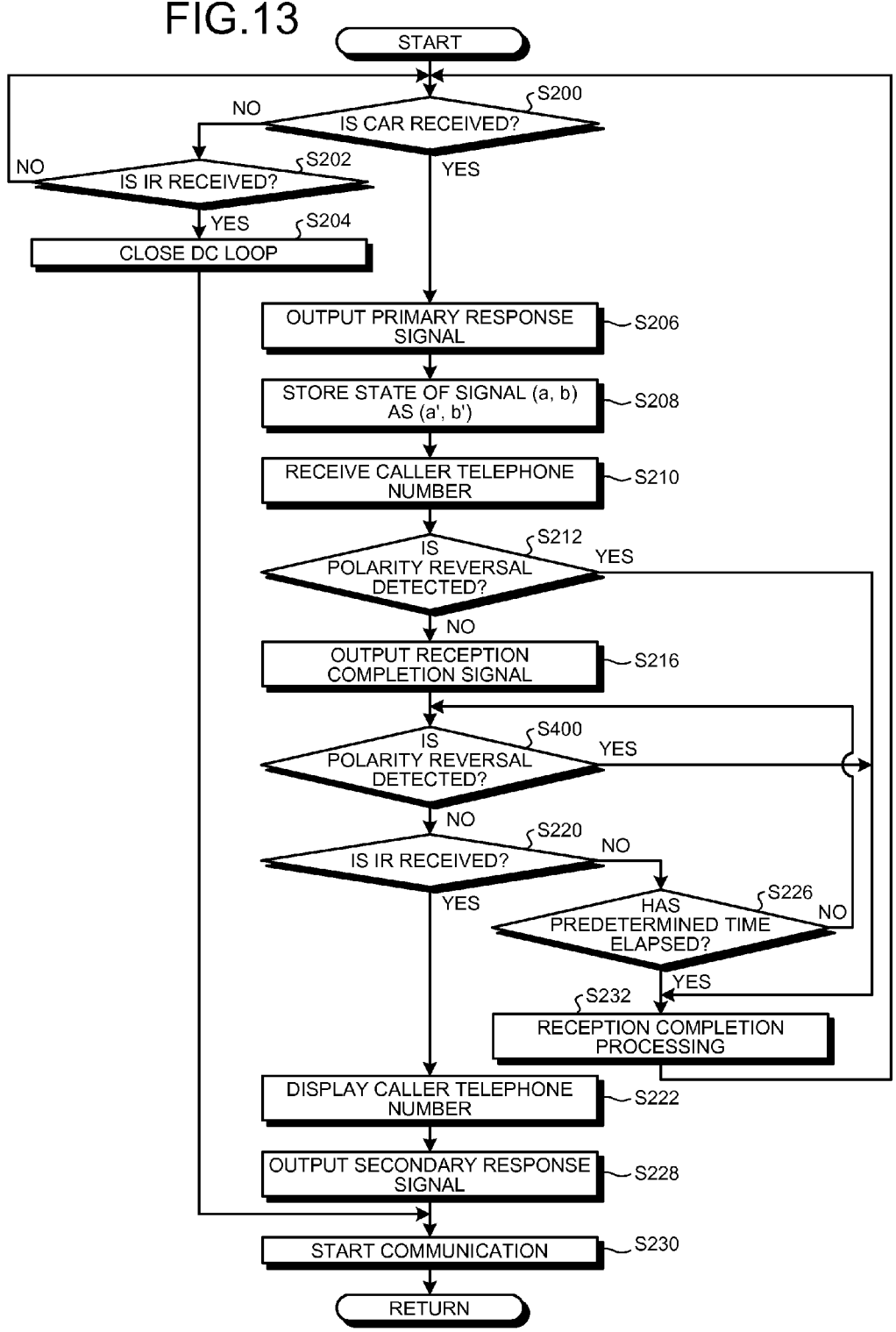

COMMUNICATION APPARATUS

CROSS-REFERENCE TO RELATED APPLICATION

The present application claims priority to and incorporates by reference the entire contents of Japanese Patent Application No. 2011-270598 filed in Japan on Dec. 9, 2011.

BACKGROUND OF THE INVENTION

1. Field of the Invention

The present invention relates to a communication apparatus.

2. Description of the Related Art

A caller ID service, which is also referred to as "a number display service", has been already known. In the caller ID service, firstly, an exchanger performs polarity reversal of a communication line through which the exchanger and a communication apparatus on a receiving side are coupled to each other. Then, the exchanger transmits a terminal activation signal (CAR signal) to the communication apparatus on a receiving side. After detecting the CAR signal, the communication apparatus on the receiving side transmits a primary response signal to the exchanger. Subsequently, after receiving the primary response signal from the communication apparatus on the receiving side, the exchanger transmits a caller telephone number such as a telephone number of a caller. In the communication apparatus on the receiving side, after a reception completion signal representing that the caller telephone number has been received is transmitted to the exchanger, a calling signal (IR) is received from the exchanger, then the caller telephone number that has been received is displayed and a communication with a caller apparatus is started.

Specifically, in the communication apparatus on the receiving side, when the terminal activation signal (CAR) is received after the polarity reversal, the line is closed to receive the caller telephone number, and then the line is opened to stand by for the calling signal (IR). After that, when the calling signal (IR) is received, the caller telephone number that has been received is displayed.

In the communication apparatus on the receiving side, the communication with the caller apparatus may be disconnected during the period, that is, from the time when the caller telephone number is received to the time when the calling signal (IR) is received. If another calling signal (IR) is received from a different caller apparatus during the period, a caller telephone number of the caller apparatus different from the caller apparatus with which communication is established may be displayed.

In order to suppress such an error output, a technology is disclosed in Japanese Patent No. 3506811, in which when polarity reversal of the line is detected and then another polarity reversal is detected while a calling sound is output to a telephone set of a receiving side, the output of the calling sound is discontinued.

However, in the related art, although the output of the calling sound can be disconnected, the error display of a caller telephone number due to disconnection of the communication with the caller cannot be suppressed.

Therefore, there is a need for a communication apparatus capable of suppressing an error display of a caller telephone number.

SUMMARY OF THE INVENTION

It is an object of the present invention to at least partially solve the problems in the conventional technology.

According to an embodiment, there is provided a communication apparatus that includes a direct-current direction detection unit configured to detect a change of direction of a direct-current on a telephone line through which the communication apparatus and an exchanger are coupled to each other; a voltage change detection unit configured to detect a change of voltage on the telephone line; a display unit configured to display a telephone number of a caller apparatus that is coupled to the telephone line; a first control unit configured to perform control such that a reception completion signal is transmitted to the exchanger when the telephone number is received from the exchanger; a first determination unit configured to determine that polarity reversal of the telephone line occurs in a first period, if any change of direction of the direct-current on the telephone line is detected in the first period, the first period being a period from the time when the telephone number is received to the time when the reception completion signal is transmitted; a second determination unit configured to determine that polarity reversal of the telephone line occurs in a second period, if any change of voltage on the telephone line is detected in the second period, the second period being a period from the time when the reception completion signal is transmitted to the time when a calling signal for calling the communication apparatus is received; and a second control unit configured to perform control such that the received telephone number is not displayed on the display unit, when it is determined that the polarity reversal of the telephone line occurs in at least one of the first period and the second period.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 10 to 12 are diagrams of the signal line a, the signal line b, the signal line c, and the signal line d of a second embodiment of the present invention; and FIG. 13 is a flowchart illustrating a display process of the caller telephone number of the second embodiment.

DETAILED DESCRIPTION OF THE PREFERRED EMBODIMENTS

Embodiments of the communication apparatus will now be described in detail with reference to accompanying drawings.

First Embodiment

Figure 1:
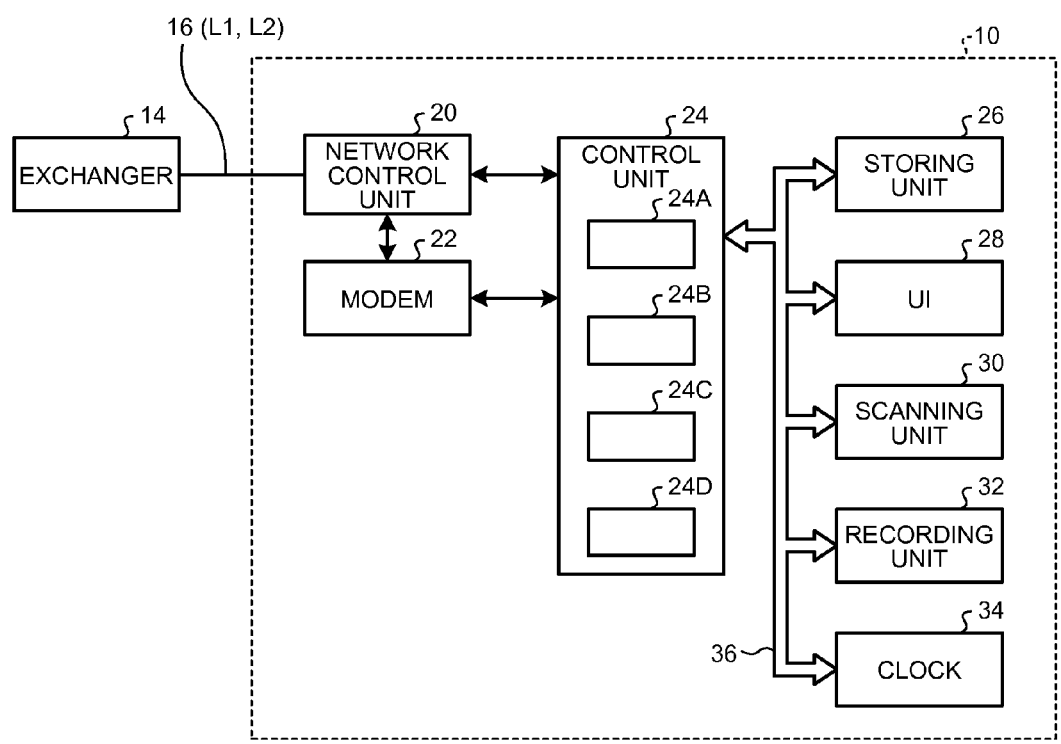
FIG. 1 is a schematic diagram of a structure of a communication apparatus of a first embodiment of the present invention.

FIG. 1 is a schematic diagram of a structure of a communication apparatus 10 of the embodiment of the present invention.

The communication apparatus 10 is coupled to an exchanger 14 through a telephone line L1 and a telephone line L2. The telephone line L1 and the telephone line L2 will be collectively referred to as a telephone line 16 in the description below.

The communication apparatus 10 communicates with another communication apparatus through the telephone line 16 and the exchanger 14. The communication apparatus 10 is a facsimile apparatus, a multifunction peripheral having a facsimile function, or a personal computer, for example. In the first embodiment of the present invention, the communication apparatus 10 applied to a facsimile apparatus will be described. The communication apparatus 10 has a caller ID function that displays thereon a caller telephone number.

Figure 2:
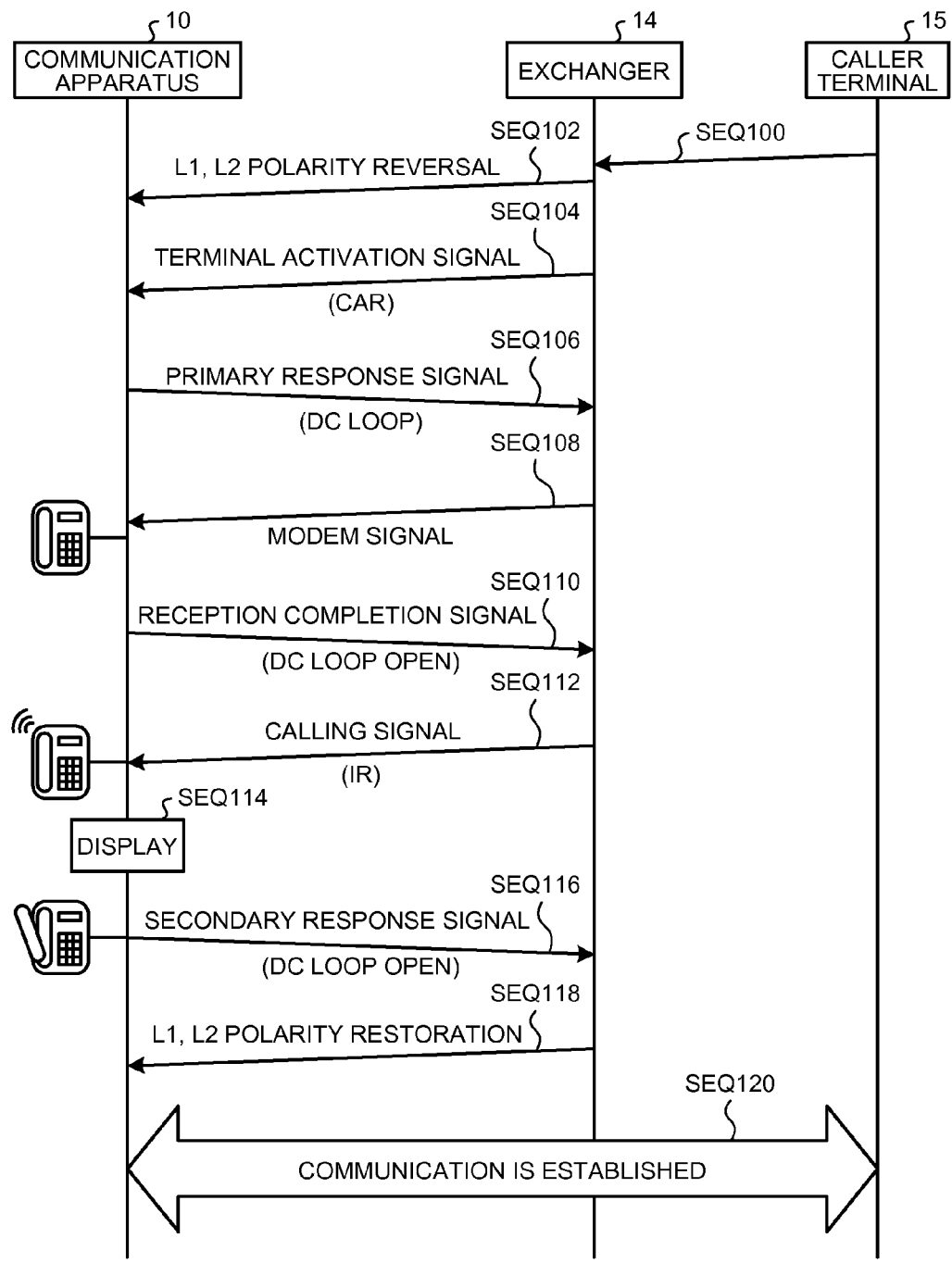
FIG. 2 is a sequence diagram illustrating a caller ID function of the first embodiment.

The overview of the caller ID function will now be described. FIG. 2 is a sequence diagram illustrating the caller ID function.

Firstly, after receiving a call from a caller terminal 15 (SEQ100), the exchanger 14 inverts the polarity between the telephone line L1 and the telephone line L2 (hereinafter, referred to as polarity reversal) (SEQ102). Polarity reversal means that the voltages applied to the telephone line L1 and the voltages applied to the telephone line L2 are inverted. If the telephone line L1 is earthed while a voltage of −48V is applied to the telephone line L2 in a normal state, through the polarity reversal, the voltage of −48V is in turn applied to the telephone line L1 and the telephone line L2 is earthed.

Subsequently, the exchanger 14 transmits a terminal activation signal (CAR) to the communication apparatus 10 (SEQ104). The terminal activation signal (CAR) is a signal that is transmitted from the exchanger 14 to the communication apparatus 10 before transmitting the caller telephone number that is the telephone number of the caller terminal 15. The terminal activation signal (CAR) is an alternating-current signal of (75−10) Vrms to (75+8) Vrms at 15 to 20 Hz that is output to the telephone line 16 intermittently every 0.4 to 0.6 second with a 0.4-to-0.6-second interval.

The communication apparatus 10 that has received the terminal activation signal line closes the telephone line 16 to output a primary response signal to the exchanger 14 (SEQ106). The exchanger 14 receives formation of a direct-current (DC) loop of the telephone line 16 formed by the communication apparatus 10 that has been detected after the output of the terminal activation signal (CAR), as the primary response signal.

The exchanger 14 that has received the primary response signal outputs a signal of the caller telephone number of the caller terminal 15 (a modem signal) to the communication apparatus 10 (SEQ108). The exchanger 14 that has received the modem signal outputs the reception completion signal to the exchanger 14 (SEQ110). Specifically, the communication apparatus 10 receives disconnection of the DC loop of the telephone line 16 due to opening of the telephone line 16 in the communication apparatus 10 as the reception completion signal.

The exchanger 14 that has received the reception completion signal outputs a calling signal for calling the communication apparatus 10 to the communication apparatus 10 (SEQ112). The calling signal (IR) is an alternating-current signal of (75−10) Vrms to (75+8) Vrms at 15 to 20 Hz that is output to the telephone line 16 intermittently every second with a two-second interval.

The communication apparatus 10 that has received the calling signal (IR) displays the caller telephone number that has already been received (SEQ114). Then, the communication apparatus 10 transmits a secondary response signal to the exchanger 14 (SEQ116). The exchanger 14 receives formation of a direct-current (DC) loop of the telephone line 16 formed by the communication apparatus 10 that has been detected after the output of the calling signal (IR), as the secondary response signal.

Subsequently, the exchanger 14 restores the inverted polarity between the telephone line L1 and the telephone line L2 (SEQ118). Specifically, the exchanger 14 inverts again the voltages applied to the telephone line L1 and the telephone line L2 to restore the voltage state before the polarity reversal is performed through the SEQ102 described above.

As a result, a normal communication (e.g., a telephone communication) is established between the communication apparatus 10 and the caller terminal 15 (SEQ120).

That is to say, after the polarity reversal between the telephone line L1 and the telephone line L2, once the communication apparatus 10 receives the terminal activation signal (CAR), the communication apparatus 10 closes the telephone line 16 in order to form the DC loop. Subsequently, the communication apparatus 10 receives a signal of the telephone number of the caller terminal 15 (modem signal). After receiving the modem signal, the communication apparatus 10 opens the telephone line 16 to stand by for the calling signal (IR). After that, when receiving the calling signal (IR), the communication apparatus 10 displays thereon the caller telephone number that has been received. If the communication apparatus 10 is a telephone terminal, it rings when the calling signal (IR) is received, but it does not ring when the terminal activation signal (CAR) is received.

As described above, in the caller ID function, the modem signal of the caller telephone number of the caller terminal 15 is transmitted from the exchanger 14 to the communication apparatus 10 prior to the calling signal (IR). As a result, the caller telephone number of the caller terminal 15 is displayed on the communication apparatus 10.

In the related art, however, the communication with the caller terminal 15 may be disconnected during the period from the time when the communication apparatus 10 receives the modem signal of the caller telephone number to the time when the communication apparatus 10 receives the calling signal (IR). In this case, if the communication apparatus 10 receives another calling signal (IR) from a different caller terminal 15, the caller telephone number that has already been received is displayed on the communication apparatus 10.

To solve this problem, the communication apparatus 10 of the embodiment of the present invention detects the disconnection of the communication with the caller terminal 15 from the time when receiving the modem signal of the caller telephone number to the time when receiving the calling signal (IR), by detecting the polarity reversal of the telephone line 16. That is, if the communication apparatus 10 has detected the disconnection of the communication with the caller terminal 15, the communication apparatus 10 does not display the caller telephone number that has already been received. Therefore, in the communication apparatus 10 of the embodiment of the present invention, error display of the caller telephone number can be suppressed.

The communication apparatus 10 of the embodiment of the present invention will now be described in detail.

With reference to FIG. 1 again, the communication apparatus 10 includes a network control unit 20, a modem 22, a control unit 24, a storing unit 26, a user interface (UI) 28, a scanning unit 30, a recording unit 32, and a clock 34. The control unit 24, the storing unit 26, the UI 28, the scanning unit 30, the recording unit 32, and the clock 34 are coupled to each other through a system bus 36.

The network control unit 20 is coupled to the exchanger 14 through the telephone line L1 and the telephone line L2. The network control unit 20 controls connection and disconnection of the modem 22 and the telephone line 16, while maintaining direct current insulation between the telephone line 16 and the communication apparatus 10.

The modem 22 modulates or demodulates the data transmitted and received between the exchanger 14 and the communication apparatus 10 and mediates the data communication between the exchanger 14 and the control unit 24. Specifically, the modem 22 modulates the data transmitted to the telephone line 16 through the network control unit 20. The modem 22 also demodulates the data received from the telephone line 16 through the network control unit 20. The modem 22 includes a fax modem function at a low speed (V.21 modem) for transmitting and receiving a transmission procedure signal, a fax modem function at a high speed (e.g., V.34 modem, V.17 modem, V33 modem, V29 modem, V.27 ter modem) for mainly transmitting and receiving image information, a data modem function (V.23 modem) for receiving telephone number information, for example.

The control unit 24 is a computer configured to include a central processing unit (CPU), a read only memory (ROM), and a random access memory (RAM) to control the whole of the communication apparatus 10. The control unit 24 performs a display process of the caller telephone number described later.

Specifically, the control unit 24 controls the connection between the network control unit 20 and the modem 22 and manages transmitting and receiving data between the modem 22 and the storing unit 26, between the modem 22 and the UI 28, between the modem 22 and the scanning unit 30, between the modem 22 and the recording unit 32, and between the modem 22 and the clock 34.

The control unit 24 includes a first control unit 24A, a first determination unit 24B, a second determination unit 24C, and a second control unit 24D. The functions of these units will be described in detail later.

The storing unit 26 stores therein various types of information. In the present embodiment, the storing unit 26 includes a store-and-forward (SAF) memory or a page memory. The SAF memory is used for a compressed data memory that accumulates therein the image information that is read by the scanning unit 30 as a temporary file. The page memory temporarily accumulates therein the image information that is read by the scanning unit 30. In addition, the page memory is used for a buffer memory used for loading data when an image of the image information is recorded by the recording unit 32. To the storing unit 26, a backup circuit (not illustrated) is coupled. In the backup circuit, the data stored in the storing unit 26 will be stored. Accordingly, the data stored in the storing unit 26 is backed up by the backup circuit. Therefore, the communication apparatus 10 of the embodiment is structured so that the content of the storing unit 26 stored therein can be maintained even when the power to the communication apparatus 10 is shutdown.

The UI 28 (display unit) is used to input or display various types of information. The UI 28 is a display with a touch panel, for example. The UI 28 may be structured to have an input device including a button, a receiving unit for remote control, and a card reader that reads information from an IC card. The UI 28 may also be structured to have at least one of a keyboard, a numeric keypad, a start key, and a key for dialing with a one-touch operation. The UI 28 may further be structured to display thereon at least one of the keyboard, the numeric keypad, the start key, and the key for dialing with a one-touch operation to be operated by a user.

In the embodiment, the UI 28 receives various types of instruction information from the user. The UI 28 displays thereon the caller telephone number, an operation state of the communication apparatus 10, or various messages.

The scanning unit 30 reads an image of a document to be communicated with another apparatus (e.g., another communication apparatus 10) through the telephone line 16 to obtain image information. For the scanning unit 30, a publicly known scanner is used. For example, the scanning unit 30 obtains image information by reading the image of the document at a predetermined density such as 3.85 lines/mm, 7.7 lines/mm, and 15.4 lines/mm. The image information obtained by the scanning unit 30 is accumulated sequentially on a line buffer in the storing unit 26 and forwarded to any device the user selects under the control of the control unit 24.

The recording unit 32 records the image of the image information received by the communication apparatus 10, or the image of the image information read by the scanning unit 30 to a recording medium. The recording unit 32 is a publicly known image forming function, for example.

The clock 34 measures the current time and has a timer function. Specifically, the clock 34 counts down a time constant set by the control unit 24. When the time constant elapses, the clock 34 notifies the control unit 24 of a signal representing the time out.

Figure 3:
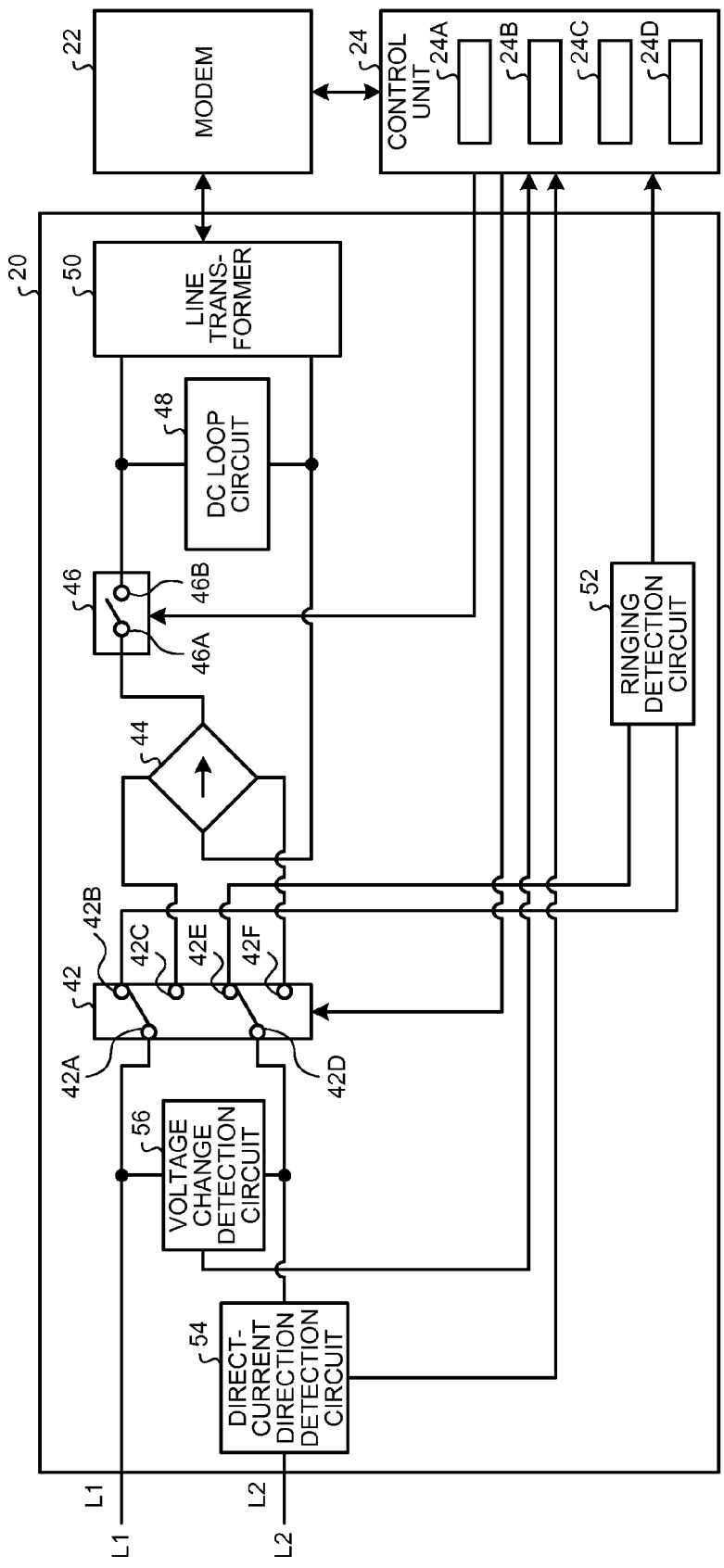
FIG. 3 is a block diagram illustrating a function structure of a network control unit of the first embodiment.

The network control unit 20 will now be described in detail. FIG. 3 is a block diagram illustrating a function structure of the network control unit 20.

The network control unit 20 includes the direct-current direction detection circuit 54, the voltage change detection circuit 56, a relay unit 42, a diode bridge 44, a loop open/closed switch 46, a DC loop circuit 48, a line transformer 50, and a ringing detection circuit 52.

The telephone line L1 of the telephone line 16 is coupled to a terminal 42A of the relay unit 42, while the telephone line L2 of the telephone line 16 is coupled to a terminal 42D of the relay unit 42. The diode bridge 44 is coupled to a terminal 42C and a terminal 42F of the relay unit 42. The diode bridge 44 is also coupled to the line transformer 50 and a terminal 46A of the loop open/closed switch 46. The ringing detection circuit 52 is coupled to a terminal 42B and a terminal 42E of the relay unit 42. The ringing detection circuit 52 is also coupled to the control unit 24.

The relay unit 42 switches the connection destination of the telephone line L1 to either the line transformer 50 or the ringing detection circuit 52, and also switches the connection destination of the telephone line L2 to either the line transformer 50 or the ringing detection circuit 52. When the telephone line L1 stands by for the connection to the ringing detection circuit 52, the relay unit 42 changes the connection state of the telephone line L1 so as to be connected to the ringing detection circuit 52. Alternatively, when the telephone line L2 stands by for the connection to the ringing detection circuit 52, the relay unit 42 changes the connection state of the telephone line L2 so as to be connected to the ringing detection circuit 52.

Specifically, the relay unit 42 switches the connection state between two states: a state in which the telephone line L1 and the ringing detection circuit 52 are coupled to each other, and a state in which the telephone line L1 and the diode bridge 44 are coupled to each other. More specifically, the relay unit 42 switches the connection state between two states: a state in which the terminal 42A and the terminal 42B are coupled to each other, and a state in which the terminal 42A and the terminal 42C are coupled to each other. Alternatively, the relay unit 42 switches the connection state between two states: a state in which the telephone line L2 and the ringing detection circuit 52 are coupled to each other, and a state in which the telephone line L2 and the diode bridge 44 are coupled to each other. More specifically, the relay unit 42 switches the connection state between two states: a state in which the terminal 42D and the terminal 42E are coupled to each other, and a state in which the terminal 42D and the terminal 42F are coupled to each other. Switching by the relay unit 42 is performed under the control of the control unit 24.

The diode bridge 44 rectifies the polarity of the direct current of the telephone line 16 in one direction. The direct current rectified reaches the loop open/closed switch 46.

The loop open/closed switch 46 is a switch for controlling the opening and closing the loop. Specifically, the loop open/closed switch 46 switches the connection state between two states: a state in which the diode bridge 44 and the line transformer 50 are coupled to each other, and a state in which these are disconnected to each other. More specifically, the loop open/closed switch 46 switches the connection state between two states: a state in which the terminal 46A and a terminal 46B are coupled to each other, and a state in which these are disconnected to each other.

When the diode bridge 44 and the line transformer 50 are coupled to each other by the loop open/closed switch 46, the telephone line 16 is closed, whereby the DC loop is formed between the exchanger 14 and the communication apparatus 10. When the diode bridge 44 and the line transformer 50 are disconnected by the loop open/closed switch 46, the telephone line 16 is opened, whereby the DC loop is disconnected.

The line transformer 50 is coupled to the diode bridge 44, the terminal 46B of the loop open/closed switch 46, and the modem 22. The line transformer 50 is a transformer to mediate the communication between the telephone line 16 and the modem 22 while maintaining the direct current insulation therebetween.

The DC loop circuit 48 is coupled to a signal line coupling the loop open/closed switch 46 to the line transformer 50 and a signal line coupling the line transformer 50 to the diode bridge 44. The DC loop circuit 48 is a circuit structured to provide a predetermined direct-current resistor when the diode bridge 44 and the line transformer 50 are coupled to each other by the loop open/closed switch 46 to close the loop.

The ringing detection circuit 52 detects the terminal activation signal (CAR) or the calling signal (IR). As described above, the terminal activation signal (CAR) is the alternating-current signal of (75−10) Vrms to (75+8) Vrms at 15 to 20 Hz that is output to the telephone line 16 intermittently every 0.4 to 0.6 second with a 0.4 to 0.6-second interval. The calling signal (IR) is the alternating-current signal of (75−10) Vrms to (75+8) Vrms at 15 to 20 Hz that is output to the telephone line 16 intermittently every second with a two-second interval.

Specifically, the ringing detection circuit 52 detects an amplitude of 15 to 20 Hz and outputs the detection result to the control unit 24. The control unit 24 measures a detection timing (on/off timing) for an amplitude of 15 to 20 Hz by the ringing detection circuit 52, thereby determining whether it is the terminal activation signal (CAR) or the calling signal (IR).

Once the terminal activation signal (CAR) is output from the exchanger 14 to the communication apparatus 10, the ringing detection circuit 52 and the control unit 24 detect the terminal activation signal (CAR). Once the terminal activation signal (CAR) is detected, the control unit 24 closes the loop open/closed switch 46 to switch to the state in which the diode bridge 44 and the line transformer 50 are coupled to each other. This operation corresponds to formation of the DC loop and also corresponds to an output of the primary response signal from the communication apparatus 10 to the exchanger 14.

The exchanger 14 that has received the primary response signal transmits the modem signal of the caller telephone number to the communication apparatus 10 0.1 to 3 seconds after the reception of the primary response signal. The control unit 24 of the communication apparatus 10 receives the modem signal through the modem 22 and stores the caller telephone number on the recording unit 32. When 0.3 second elapses after the reception of the modem signal, the control unit 24 opens the loop open/closed switch 46, thereby disconnecting the connection between the diode bridge 44 and the line transformer 50. This operation corresponds to the disconnection of the DC loop and also corresponds to the output of the reception completion signal from the communication apparatus 10 to the exchanger 14. The exchanger 14 that has received the reception completion signal outputs the calling signal (IR) to the communication apparatus 10 0.3 second after the reception of the reception completion signal. The ringing detection circuit 52 and the control unit 24 of the communication apparatus 10 detect the calling signal (IR). Once the calling signal (IR) is detected, the control unit 24 displays the caller telephone number stored in the recording unit 32 on the UI 28.

The direct-current direction detection circuit 54 detects a direction of the direct current flowing through the telephone line L2 when the DC loop between the exchanger 14 and the communication apparatus 10 is closed (the DC loop is formed). The direct-current direction detection circuit 54 is coupled in series to the telephone line L2. The direct-current direction detection circuit 54 is also coupled to the control unit 24 and outputs the detection result to the control unit 24.

The voltage change detection circuit 56 is a circuit that detects voltage change of the telephone line 16 when the DC loop between the exchanger 14 and the communication apparatus 10 is opened (disconnected). The voltage change detection circuit 56 is coupled to the telephone line L1 and the telephone line L2. The voltage change detection circuit 56 is also coupled to the control unit 24 and outputs the detection result of the voltage change to the control unit 24.

Figure 4:
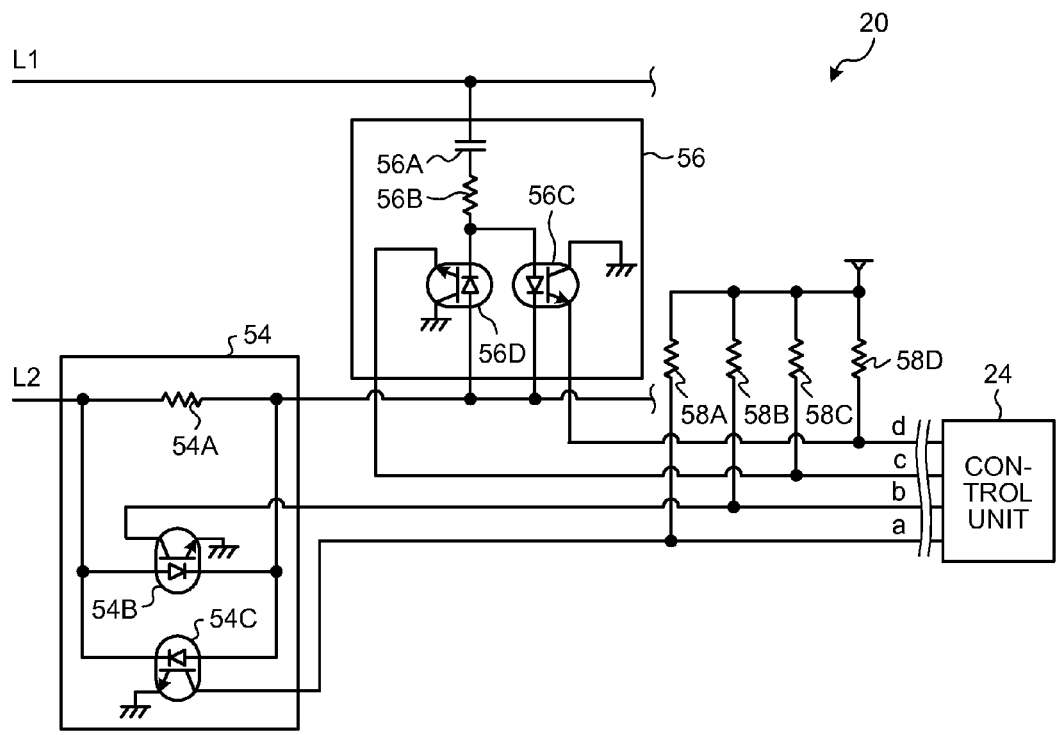
FIG. 4 is a circuit diagram of a direct-current direction detection circuit 54 and a voltage change detection circuit 56 of the first embodiment.

FIG. 4 is a circuit diagram of the voltage change detection circuit 56 and the direct-current direction detection circuit 54.

The voltage change detection circuit 56 includes a photocoupler 56D, a photocoupler 56C, a capacitor 56A, and a resistor 56B. The photocoupler 56D is coupled to the telephone line L1 and the telephone line L2. The photocoupler 56C is coupled in inverse parallel to the photocoupler 56D. The capacitor 56A and the resistor 56B are coupled in series to the photocoupler 56D. The capacitor 56A forms a circuit for charging and discharging. Either the photocoupler 56D or the photocoupler 56C operates depending on the polarity between the telephone line L1 and the telephone line L2.

In the voltage change detection circuit 56, when the DC loop is opened, the capacitor 56A is charged up to the voltage that flows between the telephone line L1 and the telephone line L2. Then, once the polarity reversal occurs between the telephone line L1 and the telephone line L2, the power in the capacitor 56A is charged and discharged up to the voltage in the inverted direction due to the polarity reversal. The charge and discharge time period depends on the time constant determined based on the capacitor 56A and the resistor 56B. The charge and discharge time period has been set so as to be the minimum value in a range that includes a time period required for the detection and meets the standard that has been set in advance.

The resistor 56B determines the current values of the photocoupler 56D and the photocoupler 56C in addition to the charge and discharge time period. Accordingly, the resistor value of the resistor 56B is set in advance so that a current exceeding the maximum operating current for the photocoupler 56D and the photocoupler 56C does not flow in the photocoupler 56D and the photocoupler 56C.

A resistor 58C and a resistor 58D are pull-up resistors for the signal line c and the signal line d. When the photocoupler 56C and the photocoupler 56D of the voltage change detection circuit 56 are turned on, a current flows in the resistor 58C and the resistor 58D, whereby the signal line c and the signal line d are set to a low level.

Specifically, when the telephone line 16 is opened, then the DC loop that has been formed between the exchanger 14 and the communication apparatus 10 is disconnected and the DC loop is opened. In this state, when the potential of the telephone line L1 and the potential of the telephone line L2 change the relationship therebetween from L1<L2 to L1>L2, a current flows in the resistor 58C and a low pulse with a certain width is output to the signal line c. In this state, when the potential of the telephone line L1 and the potential of the telephone line L2 change the relationship therebetween from L1>L2 to L1<L2, a current flows in the resistor 58D and a low pulse with a certain width is output to the signal line d.

The direct-current direction detection circuit 54 includes a photocoupler 54B, a photocoupler 54C, and a resistor 54A. The photocoupler 54B is coupled in parallel to the telephone line L2. The photocoupler 54C is coupled in inverse parallel to the photocoupler 54B. Either the photocoupler 54B or the photocoupler 54C operates depending on the polarity of the telephone line L2.

The resistor 54A determines the current values of the photocoupler 54B and the photocoupler 54C. Accordingly, the resistor value of the resistor 54A is set in advance so that a current exceeding the maximum operating current for the photocoupler 54B and the photocoupler 54C does not flow in the photocoupler 54B and the photocoupler 54C.

A resistor 58A and a resistor 58B of the direct-current direction detection circuit 54 are pull-up resistors for the signal line a and the signal line b. When the photocoupler 54B and the photocoupler 54C are turned on, a current flows in the resistor 58A and the resistor 58B, whereby the signal line a and the signal line b are set to a low level.

Specifically, if the telephone line 16 is closed so that the DC loop is formed between the exchanger 14 and the communication apparatus 10 and the potential of the telephone line L1 and the potential of the telephone line L2 have a relationship of L1>L2, the photocoupler 54C of the direct-current direction detection circuit 54 is turned on, a current flows in the resistor 58A, whereby the signal line a is set to a low level. By contrast, if the telephone line 16 is closed so that the DC loop is formed between the exchanger 14 and the communication apparatus 10 and the potential of the telephone line L1 and the potential of the telephone line L2 have a relationship of L2>L1, the photocoupler 54B of the direct-current direction detection circuit 54 is turned on, a current flows in the resistor 58B, whereby the signal line b is set to a low level.

The signal line a through the signal line d will now be described in detail.

Figure 5:
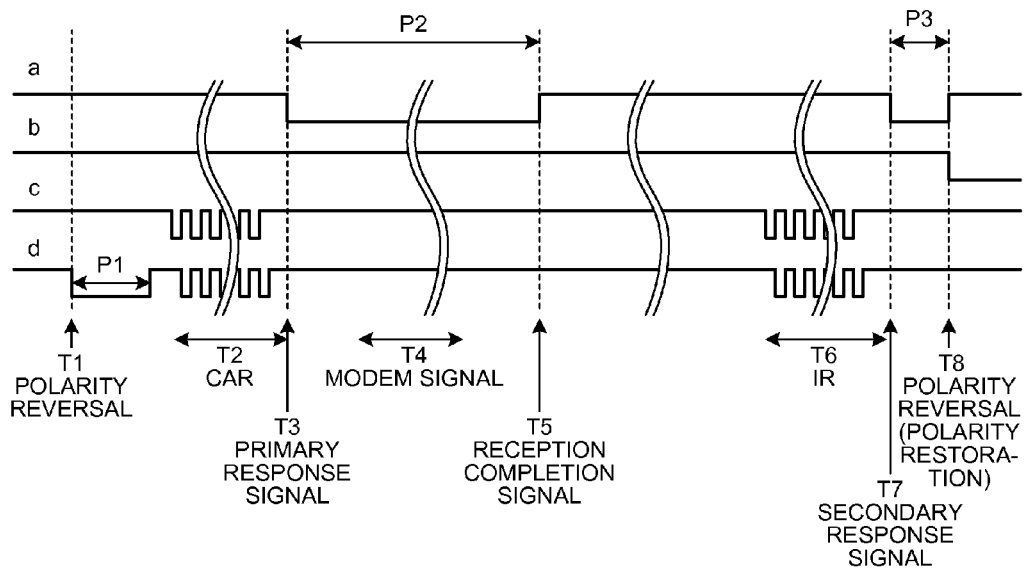
FIGS. 5 to 7 are diagrams of a signal line a, a signal line b, a signal line c, and a signal line d of the first embodiment.
Figure 6:
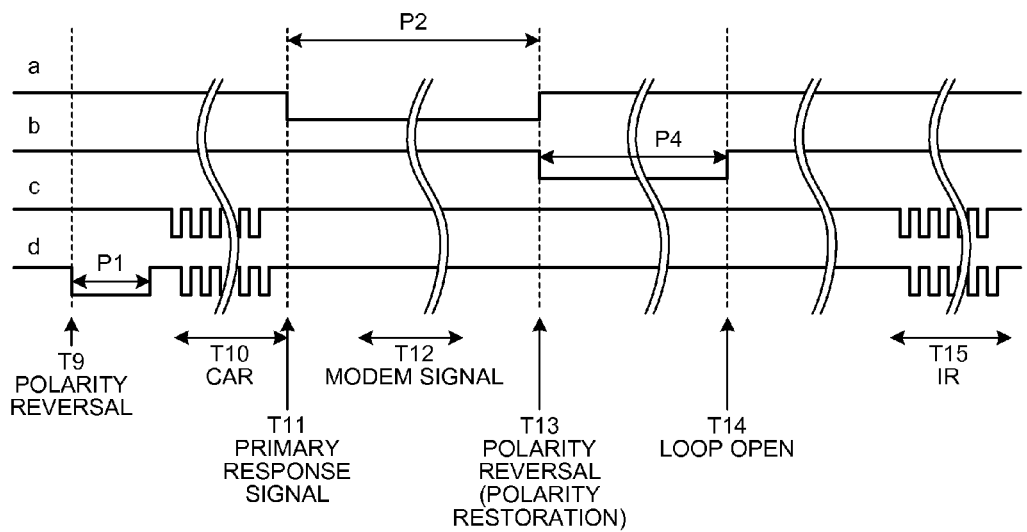
Figure 7:
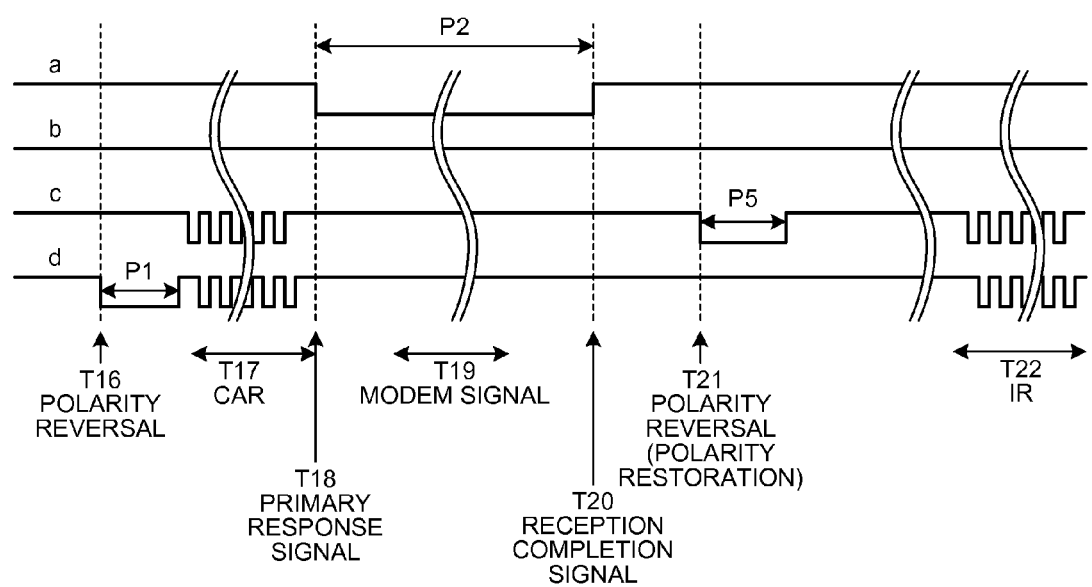

FIGS. 5 to 7 are schematic diagrams of a signal line a, a signal line b, a signal line c, and a signal line d in the display process of the caller telephone number during a standby period (the period before the reception of the polarity reversal illustrated in FIG. 2 (SEQ102)) in which the potential of the telephone line L1 and the potential of the telephone line L2 have a relationship of L1<L2.

FIG. 5 illustrates operations of the signal line a, the signal line b, the signal line c, and the signal line d when the polarity reversal due to disconnection of the telephone communication with the caller terminal 15 that can be identified by the caller telephone number in the modem signal of the caller telephone number that has been received immediately before, did not occur both in a first period and a second period.

The first period is a period from the time when the modem signal of the caller telephone number is received from the exchanger 14 to the time when the reception completion signal in response to the modem signal is transmitted. The second period is a period from the time when the reception completion signal is transmitted to the time when the calling signal (IR) of the caller terminal 15 that can be identified by the modem signal of the caller telephone number is received.

As illustrated in FIG. 5, when the polarity reversal of the telephone line 16 occurs (timing T1), the signal line d is set to the low level during a period P1. Subsequently, when the communication apparatus 10 receives the terminal activation signal (CAR), the terminal activation signal is output to the signal line c and the signal line d (timing T2). When the communication apparatus 10 outputs the primary response signal (timing T3) and then receives the modem signal from the exchanger 14, the modem signal is output to the signal line a during a period P2 (timing T4). When the communication apparatus 10 outputs the reception completion signal (timing T5), the signal line a returns to a high level and the calling signal (IR) is output to the signal line c and the signal line d (timing T6). When the communication apparatus 10 outputs the secondary response signal (timing T7), the signal line a is set to the low level during a period P3. Through the polarity reversal of the telephone line 16 (timing T8), the signal line a returns to a high level and the signal line b is set to the low level.

FIG. 6 illustrates operations of the signal line a, the signal line b, the signal line c, and the signal line d when the polarity reversal due to disconnection of the communication with the caller terminal 15 occurs in the first period.

As illustrated in FIG. 6, when the polarity reversal of the telephone line 16 occurs (timing T9), the signal line d is set to the low level during the period P1. Subsequently, when the communication apparatus 10 receives the terminal activation signal (CAR), the terminal activation signal is output to the signal line c and the signal line d (timing T10). When the communication apparatus 10 outputs the primary response signal (timing T11) and then receives the modem signal from the exchanger 14, the modem signal is output to the signal line a during the period P2 (timing T12). If the polarity reversal of the telephone line 16 occurs (timing T13) to restore the polarity, the signal line a returns to the high level and the signal line b is set to the low level during a period P4. When the DC loop is disconnected (timing T14), the signal line b returns to the high level and the calling signal (IR) is output to the signal line c and the signal line d (timing T15).

As a result, if the potential of the telephone line L1 and the potential of the telephone line L2 have a relationship of L1<L2, when the low level (0) of the signal line b is detected during the first period, the control unit 24 determines that the telephone communication with the caller terminal 15 is disconnected during the first period.

FIG. 7 illustrates operations of the signal line a, the signal line b, the signal line c, and the signal line d when the polarity reversal of the telephone line 16 due to disconnection of the communication with the caller terminal 15 occurs in the second period.

As illustrated in FIG. 7, when the polarity reversal of the telephone line 16 occurs (timing T16), the signal line d is set to the low level during the period P1. Subsequently, when the communication apparatus 10 receives the terminal activation signal (CAR), the terminal activation signal is output to the signal line c and the signal line d (timing T17). When the communication apparatus 10 outputs the primary response signal (timing T18) and then receives the modem signal from the exchanger 14, the modem signal is output to the signal line a during the period P2 (timing T19). When the communication apparatus 10 outputs the reception completion signal (timing T20), the signal line a returns to the high level. If the polarity reversal of the telephone line 16 occurs (timing T21) to restore the polarity, the signal line c is set to the low level during a period P5. Then, the calling signal (IR) is output to the signal line c and the signal line d (timing T22).

As a result, if the potential of the telephone line L1 and the potential of the telephone line L2 have a relationship of L1<L2, when the low level (0) of the signal line c is detected during the second period, the control unit 24 determines that the telephone communication with the caller terminal 15 is disconnected during the second period.

As illustrated in FIGS. 5 to 7, a voltage changes periodically while the terminal activation signal (CAR) is being received and while the calling signal (IR) is being received. Accordingly, a periodic pulse occurs in the signal line c and the signal line d. It should be noted that the width of the low pulse at the time of polarity reversal (refer to the periods P4 and P5) is larger than a receiving period of the terminal activation signal or a receiving period of the calling signal. Therefore, in the control unit 24, the terminal activation signal (CAR), the calling signal (IR), and the polarity reversal can be distinguished from each other by measuring the pulse width thereof.

When the polarity reversal is detected in the first period and the second period (polarity restoration), the communication apparatus 10 of the embodiment of the present invention determines that the communication with the caller terminal 15 is disconnected. As a result, even if the calling signal (IR) is received afterward, the calling signal (IR) is processed as another calling different from the calling received before, so that the caller telephone number that has been received at that time is not displayed. This operation will be described in detail later.

It should be noted that the potential of the telephone line L1 and the potential of the telephone line L2 have a relationship of L1>L2 during the standby period, operations of the signal line a and the signal line b are performed in reverse order from that illustrated in FIGS. 5 to 7 and operations of the signal line c and the signal line d are performed in reverse order from that illustrated in FIGS. 5 to 7.

As a result, when the control unit 24 in the communication apparatus 10 of the embodiment of the present invention detects that the potential of the signal line a and the potential of the signal line b in the first period are different from the potential of the signal line a and the potential of the signal line b before the reception of the modem signal, the control unit 24 determines that the polarity reversal of the telephone line 16 (i.e., polarity restoration) has occurred and the communication with the caller terminal 15 has been disconnected. In other words, when the control unit 24 detects that either the potential of the signal line a or the potential of the signal line b in the first period is at the low level, the control unit 24 determines that the polarity reversal of the telephone line 16 has occurred (i.e., polarity restoration), thereby determining that the communication with the caller terminal 15 is disconnected in the first period.

When the control unit 24 in the communication apparatus 10 of the embodiment of the present invention detects that either the potential of the signal line c or the potential of the signal line d in the second period is at the low level, and the period in which the signal is at the low level is longer than the receiving period of the terminal activation signal (CAR) or the receiving period of the calling signal, the control unit 24 determines that the polarity reversal of the telephone line 16 has occurred (i.e., polarity restoration), thereby determining that the communication with the caller terminal 15 is disconnected in the second period.

With reference to FIG. 1 again, the first control unit 24A controls information and a signal that are transmitted and received between the communication apparatus 10 and the exchanger 14 while the caller ID function described above is performed. Specifically, the first control unit 24A controls timing for transmitting various signals and information such as the terminal activation signal (CAR), the primary response signal, the reception completion signal, or the secondary response signal line described above to the exchanger 14.

If any change of the direct-current direction is detected by the direct-current direction detection circuit 54 in the first period, that is, from the time when the communication apparatus 10 receives the caller telephone number (a modem signal) to the time when the communication apparatus 10 outputs the reception completion signal, the first determination unit 24B determines that the polarity reversal of the telephone line occurred in the first period. The first determination unit 24B determines the presence of the change of the direct-current direction from a signal (pulse) that can be obtained from the signal line b and the signal line a.

If any voltage change is detected by the voltage change detection circuit 56 in the second period, that is, from the time when the communication apparatus 10 transmits the reception completion signal to the exchanger 14 to the time when the communication apparatus 10 receives the calling signal, the second determination unit 24C determines that the polarity reversal of the telephone line occurred in the second period. The second determination unit 24C determines the presence of the voltage change from a signal (pulse) that can be obtained from the signal line c and the signal line d.

When it is determined that the polarity reversal of the telephone line 16 occurred in at least either the first period or the second period, the second control unit 24D determines that the communication with the caller terminal 15 is disconnected, and performs control so that the telephone number that has been received at that time is not displayed on the UI 28.

Figure 8:
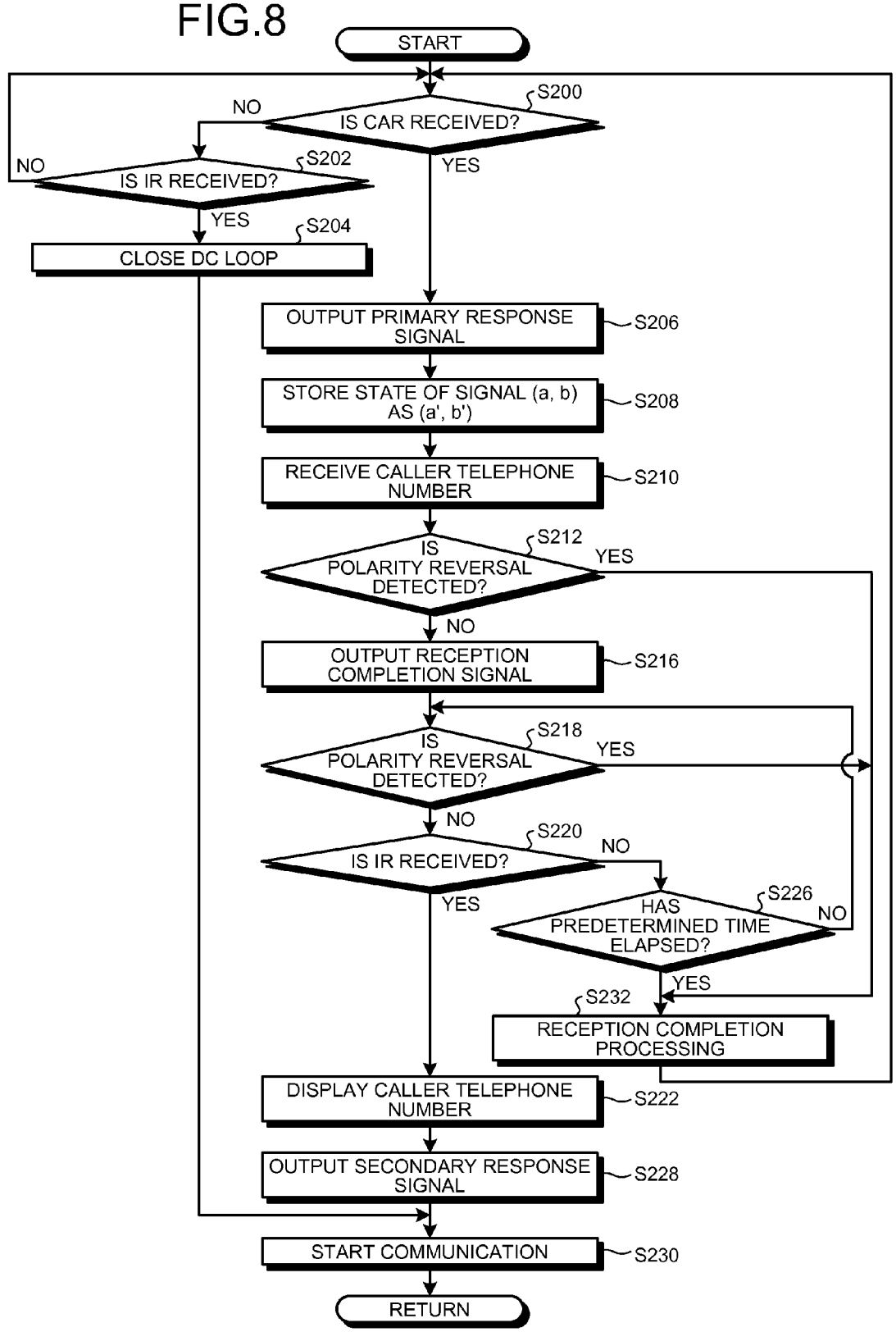
FIG. 8 is a flowchart illustrating a display process of a caller telephone number of the first embodiment.

Subsequently, the display process of the caller telephone number performed by the control unit 24 in the communication apparatus 10 of the embodiment of the present invention will now be described. FIG. 8 is a flowchart illustrating the display process of the caller telephone number of the first embodiment performed by the control unit 24.

The first control unit 24A determines whether the terminal activation signal (CAR) is received (Step S200). If negative determination is done at Step S200, the processing proceeds to Step S202. If positive determination is done at Step S200, the processing proceeds to Step S206.

At Step S206, the first control unit 24A outputs the primary response signal (Step S206) and stores the state of the signal line a and the signal line b while the DC loop is closed as (a', b') to the recording unit 32 (Step S208). Subsequently, when the modem signal of the caller telephone number is received from the exchanger 14 (Step S210), the processing proceeds to Step S212.

At Step S212, the first determination unit 24B determines whether the polarity reversal is detected (Step S212). Specifically, the control unit 24 determines whether the values of the signal line a and the signal line b are not equal to the values stored at Step S208 described above ((a, b)≠(a', b')). If the values are not equal to the values stored at Step S208, the control unit 24 performs positive determination, which means the polarity reversal is detected (Yes at Step S212), the processing proceeds to Step S232.

In the determination at Step S232, the first determination unit 24B detects that, the potential of the signal line a and the potential of the signal line b in the first period are different from the potential of the signal line a and the potential of the signal line b before the reception of the modem signal. Through this detection, the first determination unit 24B determines that the polarity reversal of the telephone line 16 (i.e., polarity restoration) has occurred and the communication with the caller terminal 15 has been disconnected.

At Step S232, the first control unit 24A ends the reception process relating to the caller ID service (Step S232) and the processing returns to Step S200 described above. At Step S232, the first control unit 24A closes the telephone line 16, thereby transmitting a signal representing the end of the reception process to the exchanger 14. As a result, the control unit 24 returns to the standby mode for the terminal activation signal (CAR) or the calling signal (IR) again.

If it is determined that the first determination unit 24B has not detected the polarity reversal at Step S212 described above (No at Step S212), the processing proceeds to Step S216. At Step S216, the first control unit 24A outputs the reception completion signal to the exchanger 14 (Step S216).

Subsequently, the second determination unit 24C determines whether the polarity reversal is detected (Step S218). Specifically, when the second determination unit 24C detects that either the signal line c or the signal line d is at the low level (0) during the second period, and the period in which the signal is at the low level is longer than the receiving period of the terminal activation signal (CAR) or the receiving period of the calling signal, the control unit 24 determines that the polarity reversal (i.e., polarity restoration) of the telephone line 16 has occurred. Through the processing at Step S218, the second determination unit 24C determines that the communication with the caller terminal 15 is disconnected in the second period.

If positive determination is done at Step S218 (Yes at Step S218), that is, the polarity reversal is detected and the telephone communication is disconnected in the second period, the processing proceeds to Step S232 to end the reception process relating to the caller ID service. The processing returns to Step S200 described above.

If negative determination is done at Step S218 (No at Step S218), that is, the second determination unit 24C has not determined that the communication is disconnected in the second period, the processing proceeds to Step S220.

At Step S220, the first control unit 24A determines whether the calling signal (IR) is received (Step S220). If negative determination is done at Step S220 (No at Step S220), the processing proceeds to Step S226 to determine whether a predetermined time has elapsed (Step S226). If negative determination is done at Step S226 (No at Step S226), the processing returns to Step S218 described above. If positive determination is done at (Yes at Step S226), the processing returns to Step S232.

If positive determination is done at Step S220 (Yes at Step S220), that is, the first control unit 24A determined that the calling signal (IR) is received, the second control unit 24D displays the caller telephone number that has been received at Step S210 on the UI 28 (Step S222).

Subsequently, the first control unit 24A outputs the secondary response signal to the exchanger 14 (Step S228). The processing proceeds to Step S230. At Step S230, the communication is started between the communication apparatus 10 and the caller terminal 15.

If negative determination is done at Step S200 described above (No at Step S200), the processing proceeds to Step S202. At Step S202, the first control unit 24A determines whether the calling signal (IR) is received (Step S202). If negative determination is done at Step S202 (No at Step S202), the processing returns to Step S200 described above. If positive determination is done at Step S202 (Yes at Step S202), the processing proceeds to Step S204. At Step S204, the first control unit 24A closes the DC loop and the processing proceeds to Step S230 described above.

As described above, if the communication apparatus 10 of the embodiment of the present invention detects the polarity reversal of the telephone line 16 in the first period or the second period, the communication apparatus 10 determines that the communication with the caller terminal 15 is disconnected and performs control so that the caller telephone number that has been received is not displayed on the UI 28. If the communication apparatus 10 has not detected the polarity reversal of the telephone line 16 in the first period and the second period, the communication apparatus 10 determines that the communication with the caller terminal 15 is continued and performs control so that the caller telephone number that has been received is displayed on the UI 28.

Therefore, in the communication apparatus 10 of the embodiment of the present invention, the error display of the caller telephone number can be suppressed.

The communication apparatus 10 of the embodiment detects the polarity reversal of the telephone line 16 in the first period using an output signal from the voltage change detection circuit 56. The communication apparatus 10 of the embodiment of the present invention detects the polarity reversal of the telephone line 16 in the second period using an output signal from the direct-current direction detection circuit 54. With this detection, the communication apparatus 10 detects disconnection of the communication with the caller terminal 15 that occurs in the first period or the second period.

Therefore, in the communication apparatus 10 of the embodiment of the present invention, error display of the caller telephone number can be readily suppressed with a simple configuration.

In the display process of the caller telephone number described with reference to FIG. 8, a busy signal may be transmitted from the exchanger 14 to the communication apparatus 10 if the communication with the caller terminal 15 has been disconnected. Specifically, the exchanger 14 may transmit the busy sound to the communication apparatus 10 after the polarity reversal of the telephone line 16 connected to the communication apparatus 10 when the communication with the caller terminal 15 is disconnected while the DC loop between the exchanger 14 and the communication apparatus 10 is closed. The communication apparatus 10 determines that the communication with the caller terminal 15 is disconnected when the communication apparatus 10 detects the polarity reversal and also detects the busy sound while the DC loop is closed. Therefore, in the communication apparatus 10, the disconnection of the communication with the caller terminal 15 can be detected accurately.

Figure 9:
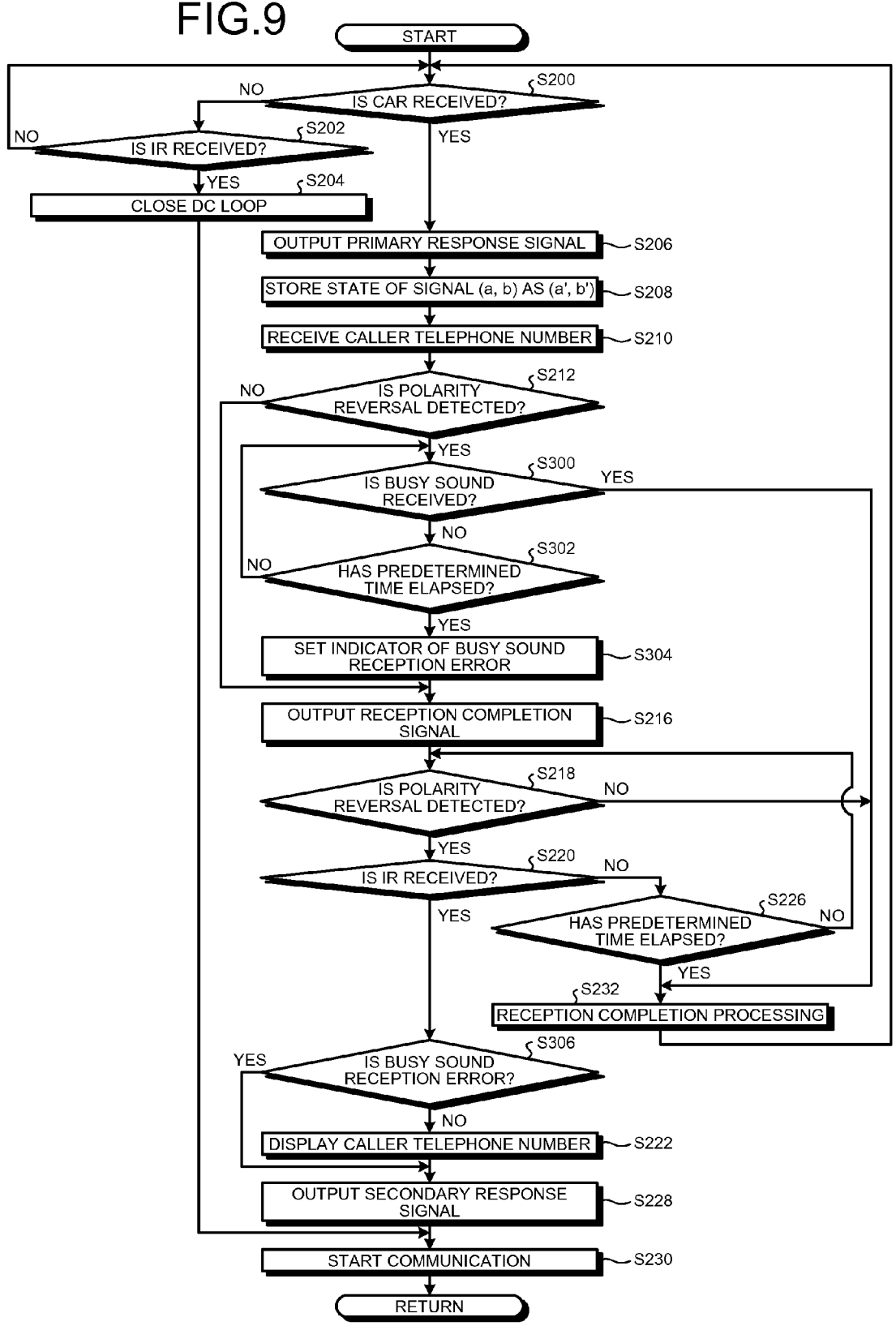
FIG. 9 is a flowchart illustrating another display process of the caller telephone number of the first embodiment.

We will now describe the display process of the caller telephone number performed by the communication apparatus 10 when the busy sound is received from the exchanger 14. FIG. 9 is a flowchart illustrating another display process of the caller telephone number performed by the communication apparatus 10, which is different from the processing illustrated in the flowchart in FIG. 8.

The control unit 24 of the communication apparatus 10 performs processing at Steps S200 to S212 in the same manner as illustrated in FIG. 8. Accordingly, when the communication apparatus 10 receives the terminal activation signal (CAR), the communication apparatus 10 outputs the primary response signal line and stores the states of the signal line a and the signal line b on the recording unit 32. After that, the communication apparatus 10 receives the modem signal of the caller telephone number, and then, determines the presence of the polarity reversal.

Subsequently, if positive determination is done at Step S212 (Yes at Step S212), that is, the polarity reversal is detected, the processing proceeds to Step S300 to repeat determination whether the busy sound is received from the exchanger 14 (Step S300) until a predetermined time has elapsed (No at Step S302). If the busy sound is received from the exchanger 14 within the predetermined time, (No at Step S302, Yes at Step S300) the processing proceeds to Step S232 for the reception completion process (Step S232), and returns to Step S200.

Specifically, the first control unit 24A determines that the communication with the caller terminal 15 is disconnected due to the presence of the polarity reversal and stands by for the busy sound. When the first control unit 24A detects the busy sound, the first control unit 24A ends the reception process and returns to a standby mode for the terminal activation signal (CAR) and the calling signal (IR).

If the first control unit 24A has not detected the busy sound within the predetermined time (No at Step S300, Yes at Step S302), the processing proceeds to Step S304. At Step S304, the first control unit 24A stores (sets) an indicator that indicates a busy sound reception error to the storing unit 26 (Step S304), and the processing proceeds to Step S216.

The control unit 24 performs processing at Steps S216, S218, S220, S226, and S232 in the same manner as illustrated in FIG. 8. If positive determination is done at Step S220 (Yes at Step S220), the processing proceeds to Step S306.

At Step S306, the first control unit 24A determines whether the busy sound reception error occurs (Step S306). The first control unit 24A performs determination at Step S306 by determining whether the indicator for the busy sound reception error has been set through the processing at Step S304.

If the busy sound reception error has not occurred, negative determination is done (No at Step S306), and the processing proceeds to Step S222. At Step S222, the second control unit 24D displays the caller telephone number that has been received at Step S210 on the UI 28, and the processing proceeds to Step S228. If positive determination is done at Step S306 (Yes at Step S306), that is, the busy sound reception error has not occurred, the processing proceeds to Step S228 without performing processing at Step S222. At Step S228, the first control unit 24A outputs the secondary response signal to the exchanger 14, and the processing proceeds to Step S230 to start the communication with the caller terminal 15.

As described above, if the exchanger 14 transmits the busy sound to the communication apparatus 10 when the communication with the caller terminal 15 is disconnected, the communication apparatus 10 determines the presence of the polarity reversal based on inversion of the signal line a and the signal line b after receiving the modem signal of the caller telephone number and stands by for the busy sound. If the busy sound is detected, the communication apparatus 10 ends the reception process to return to the standby mode for the terminal activation signal (CAR) and the calling signal (IR). If it is determined that the polarity reversal (disconnection of the communication with the caller terminal 15 in the first period) has occurred, the communication apparatus 10 stands by for the busy sound until it receives the busy sound. When the communication apparatus 10 receives the busy sound, the communication apparatus 10 ends the processing. If it is determined that the polarity reversal has occurred and no busy sound is received within the predetermined period, the communication apparatus 10 outputs the reception completion signal line and returns to prior processing without displaying the caller telephone number that has been received on the UI 28. This is because if the calling signal (IR) is received, it is not likely the calling signal from the caller terminal 15 identified by the caller telephone number that has been received.

As described above, the communication apparatus 10 determines that the communication with the caller terminal 15 is disconnected when the communication apparatus 10 detects the polarity reversal while the DC loop is closed and also detects the busy sound in the first period. Therefore, in the communication apparatus 10, the disconnection of the communication with the caller terminal 15 can be detected accurately.

Second Embodiment

In the first embodiment, we have described an example in which the polarity reversal of the telephone line 16 (disconnection of the communication with the caller terminal 15) in the second period is detected using the signal (the signal line c, the signal line d) that is output from the voltage change detection circuit 56. However, when the communication apparatus 10 outputs the reception completion signal to the exchanger 14, (i.e., the DC loop is disconnected) the voltage change detection circuit 56 may respond to the voltage change and output a low pulse to the signal line c.

In the second embodiment of the present invention, detecting the low pulse output due to the voltage change as the polarity reversal by mistake is suppressed. Specifically, the communication apparatus 10 of the embodiment of the present invention detects the polarity reversal of the telephone line 16 in the second period, using both a signal output from the direct-current direction detection circuit 54 (the signal line a, the signal line b) and a signal output from the voltage change detection circuit 56 (the signal line c, the signal line d).

The structure of the communication apparatus 10 is the same as the first embodiment except that a method for determining the presence of the polarity reversal by the control unit 24 is different from the first embodiment. For this reason, the method for determining the polarity reversal in the second period according to the second embodiment will be described with the descriptions on the same functions and processing omitted.

Figure 10:
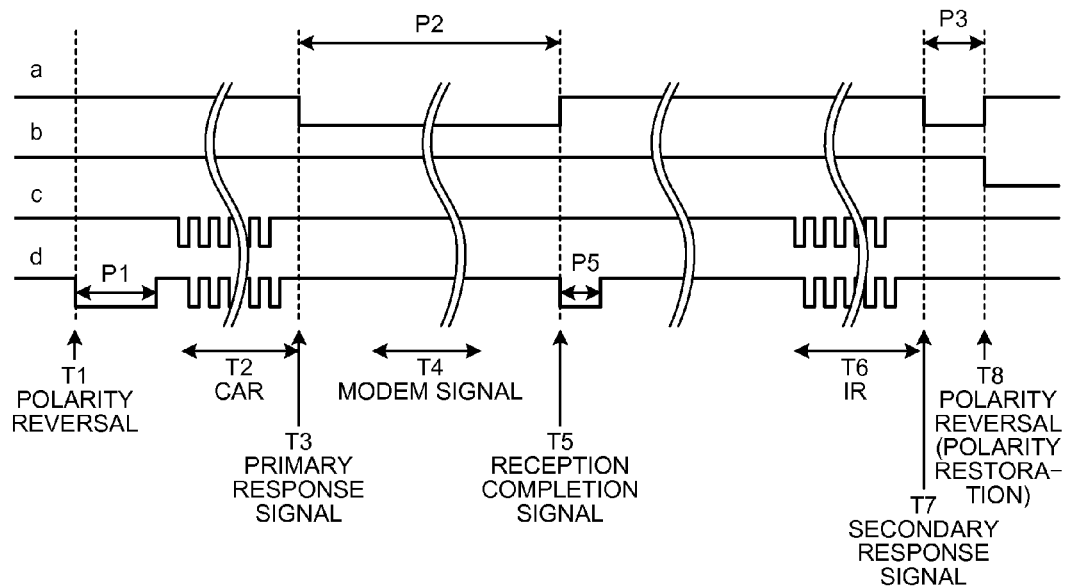
Figure 11:
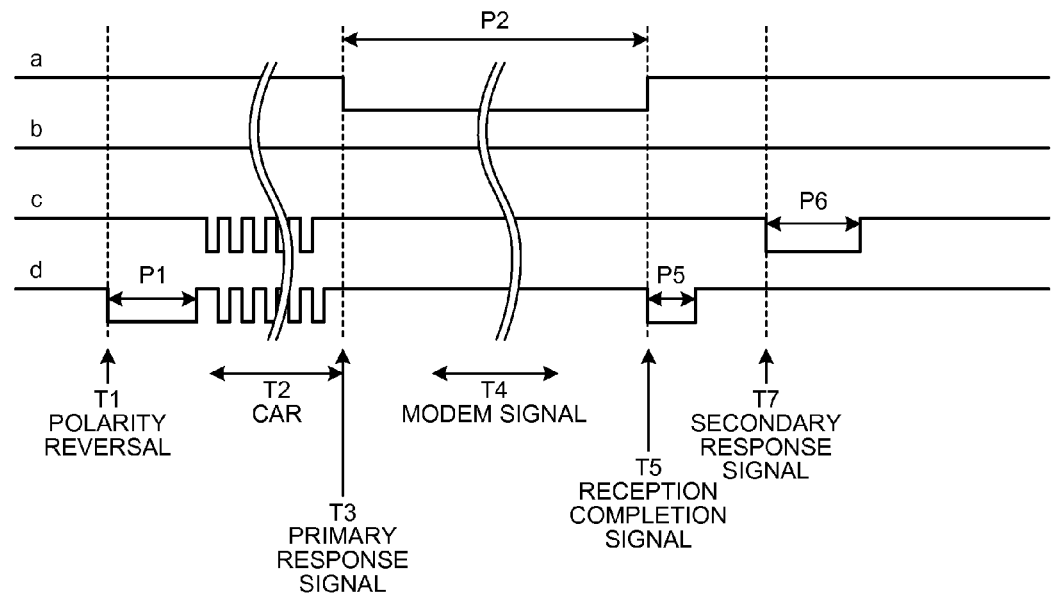

FIGS. 10 to 12 are schematic diagrams of the signal line a, the signal line b, the signal line c, and the signal line d when the modem signal of the caller telephone number is received during a standby period (the period before the reception of the polarity reversal illustrated in FIG. 2 (SEQ102)) in which the potential of the telephone line L1 and the potential of the telephone line L2 have a relationship of L1<L2. In FIGS. 10 to 12 an example is illustrated in which the voltage change detection circuit 56 responds to the voltage change that has occurred when the communication apparatus 10 outputs the reception completion signal to the exchanger 14, (i.e., the DC loop is disconnected), and then a low pulse is output to the signal line c.

Specifically, FIG. 10 illustrates operations of the signal line a, the signal line b, the signal line c, and the signal line d when the polarity reversal due to disconnection of the telephone communication with the caller terminal 15 that can be identified by the caller telephone number in the modem signal of the caller telephone number that has been received immediately before, has occurred neither in the first period nor in the second period.

As illustrated in FIG. 10, when the polarity reversal of the telephone line 16 occurs (timing T1), the signal line d is set to the low level during the period P1 in the same manner as illustrated in FIG. 5. Subsequently, when the communication apparatus 10 receives the terminal activation signal (CAR), the terminal activation signal is output to the signal line c and the signal line d (timing T2). After outputting the primary response signal (timing T3), when the communication apparatus 10 receives the modem signal from the exchanger 14, the modem signal is output to the signal line a during the period P2 (timing T4). When the communication apparatus 10 outputs the reception completion signal (timing T5), the signal line a returns to the prior high level and the calling signal (IR) is output to the signal line c and the signal line d (timing T6). When the communication apparatus 10 outputs the secondary response signal (timing T7), the signal line a is set to the low level during the period P3. Through the polarity reversal of the telephone line 16 (timing T8), the signal line a returns to the high level and the signal line b set to the low level.

As illustrated in FIG. 10, the voltage change detection circuit 56 may respond to the voltage change that has occurred due to the output of the reception completion signal (timing T5) and a low pulse may be output to the signal line c during the period P5 that follows the timing T5.

As a result, the control unit 24 may detect the low pulse on the signal line c during the period P5 as the polarity reversal.

A method to distinguish between the low pulse that is output to the signal line d due to the polarity reversal during the period P1 and the low pulse that is output to the signal line d due to the voltage change caused by the reception completion signal line during the period P5 is, for example, as follows: the control unit 24 determines that the polarity reversal is present if the length of the period in which the signal is at the low pulse is larger than a predetermined threshold, and determines that the polarity reversal is not present if the length of the period in which the signal is at the low pulse is equal to or smaller than the threshold.

However, if the period P1 with the low pulse due to the polarity reversal is distinguished from the period P5 with the low pulse due to the voltage change caused by the reception completion signal using the difference of the length of periods, characteristic deviation of circuit elements included in the network control unit 20 should be eliminated.

For this purpose, the control unit 24 of the embodiment of the present invention determines a monitoring method for the signal line c and the signal line d after the output of the reception completion signal line based on the states of the signal line a and the signal line b while the DC loop is closed. With this configuration, in the control unit 24 of the embodiment of the present invention, detecting the low pulse output due to the voltage change caused by the output of the reception completion signal line as the polarity reversal by mistake is suppressed.

In the voltage change detection circuit 56 and the direct-current direction detection circuit 54, the pulse that is output to the signal lines a through d when the communication apparatus 10 outputs the reception completion signal to the exchanger 14 is different from the pulse that is output to the signal lines a through d when the polarity reversal of the telephone line 16 occurs.

Specifically, as illustrated in FIG. 11, if the potential of the telephone line L1 and the potential of the telephone line L2 in the standby mode have a relationship of L1<L2, when the reception completion signal is output, the low pulse is output to the signal line d during the period P5. When the polarity reversal occurs, the low pulse is output to the signal line c during the period P6.

If the potential of the telephone line L1 and the potential of the telephone line L2 in the standby mode have a relationship of L1>L2, as illustrated in FIG. 12, operations of the signal line a and the signal line b are performed in reverse order from that illustrated in FIG. 11 and operations of the signal line c and the signal line d are performed in reverse order from that illustrated in FIG. 11. As illustrated in FIG. 12, when the reception completion signal is output, the low pulse is output to the signal line c during the period P8. When the polarity reversal occurs, the low pulse is output to the signal line d during the period P9.

That is to say, in the direct-current direction detection circuit 54 and the voltage change detection circuit 56, when the DC loop is closed (the telephone line 16 is connected to form the DC loop, i.e., the first period) and the signal line a is at the low level, the pulse due to the polarity reversal in the second period (after the output of the reception completion signal) is generated on the signal line c. When the DC loop is closed (the first period) and the signal line b is at the low level, the pulse due to the polarity reversal in the second period (after the output of the reception completion signal) is generated on the signal line d.

As a result, if the signal line a is at the low level in the first period (the DC loop is closed) in the communication apparatus 10 of the embodiment of the present invention, the second determination unit 24C determines that the polarity reversal has occurred, that is, the communication with the caller terminal 15 is disconnected when the signal line c from the voltage change detection circuit 56 is at the low level in the second period. If the signal line b is at the low level in the first period (the DC loop is closed) in the communication apparatus 10 of the embodiment of the present invention, the second determination unit 24C determines that the polarity reversal has occurred, that is, the communication with the caller terminal 15 is disconnected when the signal line d from the voltage change detection circuit 56 is at the low level in the second period.

We will now describe the display process of the caller telephone number performed by the control unit 24 in the communication apparatus 10 of the second embodiment. FIG. 13 is a flowchart illustrating the display process of the caller telephone number of the second embodiment performed by the control unit 24 according to the second embodiment.

The control unit 24 according to the second embodiment performs the same processing as the display process of the caller telephone number performed by the control unit 24 according to the first embodiment (FIG. 8). In other words, the control unit 24 according to the second embodiment performs the same processing at Steps S200 to S230 in the first embodiment. The difference is that processing at Step S400 (refer to FIG. 13) is performed in place of the caller telephone number process at Step S218 (refer to FIG. 8) by the second determination unit 24C according to the second embodiment. For this reason, the same processing is designated by the same reference numeral and overlapped explanation thereof will be omitted.

At Step S400, the second determination unit 24C determines whether the polarity reversal is detected (Step S400). Specifically, the second determination unit 24C determines whether the signal line c and the signal line d are in the same state as the signal line a and the signal line b after the output of the primary response signal line at Step S206. That is to say, when the signal line c and the signal line d are in the same state as the signal line a and the signal line b stored in the storing unit 26 at Step S208 (a', b') and the state continues for a predetermined time, the second determination unit 24C determines that the polarity reversal occurred in the second period. If positive determination is done at Step S400 (Yes at Step S400), the processing proceeds to Step S232, and if negative determination is done at Step S400 (No at Step S400), the processing proceeds to Step S220.

As described above, the communication apparatus 10 of the embodiment of the present invention determines the presence of the polarity reversal of the telephone line 16 in the second period using the both detection results of the signal output from the direct-current direction detection circuit 54 (the signal line a, the signal line b) in the first period and the signal output from the voltage change detection circuit 56 (the signal line c, the signal line d) in the second period. Accordingly, the communication apparatus 10 determines that the communication with the caller terminal 15 in the second period has been disconnected based on the polarity reversal that has been determined.

Therefore, in the communication apparatus 10 of the embodiment of the present invention, the pulse output caused by the output of the reception completion signal is no more detected as the polarity reversal by mistake, thus error display of the caller telephone number can be suppressed with high accuracy.

The communication apparatus 10 according to the first embodiment or the communication apparatus 10 according to the second embodiment has a hardware structure in which a general computer is utilized.

The computer program executed by the communication apparatus 10 according to the first embodiment or the communication apparatus 10 according to the second embodiment is provided in a manner recorded as an installable or executable file format on a computer-readable recording medium, such as a compact disk read-only memory (CD-ROM), a flexible disk (FD), a compact disk recordable (CD-R), and a digital versatile disk (DVD).

In addition, the computer program to execute the display process of the caller telephone number performed by the communication apparatus 10 according to the first embodiment or the communication apparatus 10 according to the second embodiment may also be provided in a manner stored in a computer connected to a network such as the Internet so as to be downloaded through the network. The computer program to execute the display process of the caller telephone number performed by the computer program executed by the communication apparatus 10 according to the first embodiment or the communication apparatus 10 according to the second embodiment may also be provided or distributed over a network such as the Internet.

Furthermore, the computer program to execute the display process of the caller telephone number performed by the communication apparatus 10 according to the first embodiment or the communication apparatus 10 according to the second embodiment may also be provided in a manner embedded in a ROM, for example.

The control unit 24 in the communication apparatus 10 according to the first embodiment or the control unit 24 in the communication apparatus 10 according to the second embodiment has a module structure including the above-described function units (the first control unit 24A, the first determination unit 24B, the second determination unit 24C, and the second control unit 24D). As an actual hardware structure, the CPU (processor) reads the program to execute the display process of the caller telephone number from the medium described above and executes the program. Once the program is executed, the above-described function units are loaded on a main storage unit, so that the function units are created on the main storage unit.

According to the embodiments, it is possible to provide advantageous effects in that the error display of the caller telephone number can be suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication apparatus comprising:
   a direct-current direction detection unit configured to detect a change of direction of a direct-current on a telephone line through which the communication apparatus and an exchanger are coupled to each other;
   a voltage change detection unit configured to detect a change of voltage on the telephone line;
   a display unit configured to display a telephone number of a caller apparatus that is coupled to the telephone line;
   a first control unit configured to perform control such that a reception completion signal is transmitted to the exchanger when the telephone number is received from the exchanger;
   a first determination unit configured to determine that a polarity reversal of the telephone line occurs in a first period when the change of direction of the direct-current on the telephone line is detected in the first period, the first period being a period from the time when the telephone number is received to the time when the reception completion signal is transmitted;
   a second determination unit configured to determine that a polarity reversal of the telephone line occurs in a second period when the change of voltage on the telephone line is detected in the second period, the second period being a period from the time when the reception completion signal is transmitted to the time when a calling signal for calling the communication apparatus is received; and
   a second control unit configured to perform control such that the received telephone number is not displayed on the display unit, when it is determined that the polarity reversal of the telephone line occurs in at least one of the first period and the second period.

2. The communication apparatus according to claim 1, wherein the first control unit closes the telephone line to form a direct current loop between the communication apparatus and the exchanger, when it is determined that the polarity reversal of the telephone line occurs in at least one of the first period and the second period.

3. The communication apparatus according to claim 1, wherein
   the telephone line includes two lines, and
   the voltage change detection unit includes a first photocoupler coupled to the two lines;
a second photocoupler coupled in inverse parallel to the first photocoupler; and
a capacitor coupled in series to the first photocoupler.

4. The communication apparatus according to claim 3, wherein
the direct-current direction detection unit further includes
a third photocoupler coupled in parallel to one of the two lines; and
a fourth photocoupler coupled in inverse parallel to the third photocoupler.

5. The communication apparatus according to claim 4, wherein the second control unit performs control such that the received telephone number is not displayed on the display unit, if it is determined that the polarity reversal of the telephone line occurs in both the first period and the second period.

\* \* \* \* \*